(12) United States Patent
Zhengdi et al.

(10) Patent No.: US 7,522,656 B2
(45) Date of Patent: Apr. 21, 2009

(54) RECEPTION OF MULTIPLE CODE LENGTH CDMA TRANSMISSIONS

(75) Inventors: Qin Zhengdi, Tampere (FI); Seppo Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 751 days.

(21) Appl. No.: 11/091,360

(22) Filed: Mar. 16, 2005

(65) Prior Publication Data

US 2006/0209934 A1     Sep. 21, 2006

(51) Int. Cl.
*H04B 1/00*     (2006.01)
(52) U.S. Cl. ...................................... 375/150
(58) Field of Classification Search ................. 375/142, 375/143, 150, 152, 343; 704/216, 218, 237, 704/263; 708/5, 422, 813; 342/108, 145, 342/189, 378
See application file for complete search history.

(56) References Cited

U.S. PATENT DOCUMENTS

| | | | |
|---|---|---|---|
| 6,052,408 A | 4/2000 | Trompower | |
| 6,144,691 A | 11/2000 | Kenney | |
| 6,377,614 B1 * | 4/2002 | Yamashita | ................... 375/149 |
| 6,577,676 B1 * | 6/2003 | Hashimoto | ................... 375/152 |
| 6,982,971 B2 * | 1/2006 | Tiedemann et al. | ......... 370/333 |
| 2004/0131010 A1 | 7/2004 | Pan et al. | |

FOREIGN PATENT DOCUMENTS

EP     1 091 501     4/2001

OTHER PUBLICATIONS

"One Approach to Increase Capacity in DS-CDMA", H. Lervik, Norwegian University of Science and Technology, 2001. http://www.norsig.no/norsig2001/Papers/52.     One_2092001153625.pdf NORSK 2001 NORSK Symposium I SIGNALBEHANDLING, Oct. 18-20, 2001, Trondheim, Norway.

* cited by examiner

*Primary Examiner*—Sam K Ahn

(57) ABSTRACT

Code synchronization is acquired as a part of receiving and decoding a spread spectrum transmission. There are received a number of signal samples that constitute a signal sample sequence. It represents a length of a received signal spread with one full length of a pseudorandom sequence used as a spreading code. The signal sample sequence is augmented at least at one end with at least one additional symbol, which produces a padded signal sample sequence. The padded signal sample sequence is in turn correlated with a locally produced sample sequence that comprises code samples representing a known form of said spreading code. The result of said correlating is used as a basis for acquired code synchronization.

13 Claims, 4 Drawing Sheets

RECEPTION OF MULTIPLE CODE LENGTH CDMA TRANSMISSIONS

TECHNICAL FIELD

The invention is related to the technology of code acquisition in a receiver adapted to receive spread spectrum transmissions. Especially the invention is related to the problem of optimally equipping a receiver for the reception of spread spectrum transmissions with variable length of the spreading code.

BACKGROUND OF THE INVENTION

Spread spectrum communications involve spreading the signal energy to be transmitted over a relatively wide bandwidth at the transmitter and correspondingly despreading the received signal at the receiver. The spreading and despreading operations involve the use of a pseudorandom code sequence generally designated as the spreading code. Advantages of spread spectrum communications include the possibility of accommodating a large number of simultaneous transmissions onto a shared frequency band using mutually orthogonal spreading codes, as well as the inherent capability of suppressing narrowband interference during reception and despreading. Well-known examples of spread spectrum communications include the application of DS-CDMA (Direct Sequence Code Division Multiple Access) to terrestrial cellular radio networks, as well as the use of CDMA techniques in satellite-based positioning systems such as GPS (Global Positioning System) and navigation systems, several of which are planned under the general definition GNSS (Global Navigation Satellite System).

In order to be able to correctly despread a received spread spectrum signal a receiver must know the exact timing of the spreading code in the received signal. The process of establishing correct timing at the receiver is conventionally divided into two consecutive stages, which are code acquisition and code tracking. Of these, acquisition refers to coarse synchronization of the received sequence with a locally generated despreading sequence, usually to within some fraction of a chip period in the code sequence. After successful acquisition a code tracking loop is employed to achieve and maintain fine alignment of the two sequences so that a maximum amount of signal energy can be retrieved at the receiver.

A key component of the despreading operation is a matched filter, the purpose of which is to maximize the signal to noise ratio at a sampling point of a bit stream and to minimize the probability of undetected errors in the received signal. Mathematically it can be shown that the transfer function $h(t)$ of an optimal matched filter is a time-reversed and delayed version of the original transmitted signal $g(t)$. The matched filter gets as input information the known form of the pseudorandom sequence that constitutes the spreading code, so it only needs to find the correct amount of delay that leads to a maximum of retrieved signal energy. Correlating a sample sequence representing the received signal with the known form of the spreading code produces a correlation result, maximum values of which give an indication about the correct code synchronization timing.

The number of available orthogonal spreading codes may become a limiting factor to the capacity of a CDMA system. According to a traditional approach the length of the code sequence has been kept constant, which sets a constraint to the selection of spreading codes. Recently it has been suggested that co-channel interference could be reduced by introducing multiple code lengths. Similar suggestions have risen also based on a different motivating factor, namely providing a variable data rate in a connection by adapting the spreading code length according to channel conditions. A prior art publication considering the last-mentioned viewpoint is H. Lervik: "One Approach to Increase Capacity in DS-CDMA", published in 2001 by the Norwegian University of Science and Technology and available at the time of writing this description at http://www.norsig.no/norsig2001/Papers/52. One_approach_2092001153625.pdf (NORSK 2001 NORSK Symposium I SIGNALBEHANDLING, 18-20 Oct. 2001, Trondheim, Norway).

Another reason for using different code lengths for transmissions on different channels is the aim at making the cross-correlation pattern non-stationary from one code cycle to another, so that an averaging process over several code cycles can help suppressing co-channel interferences. The differences do not need to be very large to achieve this purpose; a difference of one chip or a few chips, or even a fraction of a chip, will work well.

Introducing variable code length may cause problems in designing the code acquisition hardware. At the time of writing this description a typical GPS receiver comprises at least one and a maximum of four code acquisition hardware blocks. The design of the known code acquisition hardware is intimately tied to the exact length of the code. Even if the number of active GPS satellites and their unique spreading codes is as large as 28, this is not a problem because said unique spreading codes are all equal in length and consequently any of the available code acquisition hardware blocks can be allocated to perform acquisition on the signal of any satellite. However, for example the oncoming advent of Galileo, which is a European-based GNSS system, is predicted to more than double the number of satellites and simultaneously introduce variable code length. A spread spectrum receiver built according to the conventional practice might therefore need dozens of separate code acquisition hardware blocks. This is costly in terms of both required silicon area in microcircuits and complicatedness in design, manufacture and programming. Additionally it increases the vulnerability of the receiver to hardware malfunctioning, and is likely to increase the need of operating power.

SUMMARY OF THE INVENTION

The inventive method is for performing code acquisition in a receiver adapted to despread spread spectrum transmissions having variable code length. The invention also relates to a spread spectrum receiver device adapted to receive and despread spread spectrum transmissions having variable code length. Further the invention relates to a signal processing module for use in a spread spectrum receiver, said module being capable of despreading spread spectrum transmissions having variable code length. Further the invention relates to a spread spectrum communications system adapted to utilize variable code length in transmissions aimed at a receiver. Further the invention relates to a computer program comprising computer program code for controlling the despreading of spread spectrum transmissions having variable code length.

It is common to all aspects mentioned above that the invention should help to avoid the complications associated with multiple-code-length spread spectrum receivers of the prior art. Especially the invention should achieve savings in silicon area, reduce complicatedness of manufacturing methods and programming, and lower the risk of hardware malfunctioning.

The objectives of the invention are achieved by using less acquisition hardware blocks than there are possible code sequence lengths, and adapting an acquisition operation to a mismatch between code sequence length and hardware configuration by using truncation and/or padding of the sequences involved, associated with the matching of time synchronization with the code cycle in use.

A method according to the invention is characterized in that it comprises:
receiving a number of signal samples, said number of signal samples constituting a signal sample sequence that represents a length of a received signal spread with a pseudorandom sequence used as a spreading code, said pseudorandom sequence having a length,
as a response to the length of said pseudorandom sequence being different than a dimension of a piece of code acquisition means, processing said signal sample sequence, thus producing a processed signal sample sequence,
correlating said processed signal sample sequence with a locally produced sample sequence that comprises code samples representing a known form of said spreading code, thus producing a correlation, and
using a result of said correlation as a basis for determing a code synchronization.

A receiver device according to the invention is characterized in that it comprises:
a piece of code acquisition hardware adapted to receive a signal sample sequence that represents a received signal spread with a pseudorandom sequence used as a spreading code, which pseudorandom sequence has a length;
wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, and wherein the receiver device is adapted to use a result of said correlating as a basis for determining code synchronization.

A signal processing module according to the invention is characterized in that it comprises:
a piece of code acquisition hardware adapted to receive a signal sample sequence that represents a received signal spread with a pseudorandom sequence used as a spreading code, which pseudorandom sequence has a length, wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code.

A system according to the invention is characterized in that it comprises:
a first transmitter adapted to use a first pseudorandom sequence for producing spread spectrum transmissions,
a second transmitter adapted to use a second pseudorandom sequence for producing spread spectrum transmissions, said second pseudorandom sequence being shorter in length than said first pseudorandom sequence,
a receiver adapted to receive spread spectrum transmissions from both said first transmitter and said second transmitter,
in said receiver a piece of code acquisition hardware adapted to receive a signal sample sequence that represents a length of a received signal spread with one full length of a pseudorandom sequence used as a spreading code; wherein said piece of code acquisition hardware is adapted to respond to the length of said pseudorandom sequence used as a spreading code being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, and wherein the receiver device is adapted to use a result of said correlating as a basis for determining a code synchronization.

A computer program product according to the invention is characterized in that it comprises:
computer code adapted to drive a piece of code acquisition hardware for augmenting a signal sample sequence at least at one end with at least one additional symbol, thus producing a padded signal sample sequence, and
computer code adapted to drive said piece of code acquisition hardware for correlating said padded signal sample sequence with a locally produced sample sequence that comprises code samples representing a known form of said spreading code.

According to an underlying principle of the invention, it is not necessary to have an exact match between the length of a spreading code in use and the "length" of a matched filter. The last-mentioned is defined as the number of elements a matched filter is by default adapted to handle as those constituting the known form of the code sequence.

If the matched filter is "longer" than the spreading code in use, it is possible to use padding, which is synonymous to using zeroes or other neutral elements at the beginning and/or end of the sample sequence that represents the received signal when it is fed to the matched filter. Concerning the known form of the code sequence used by the matched filter, it can be similarly padded, so that the "model" code consists of the actual known form of the spreading code with a neutral extension added to at least one end thereof. Another possibility is to extend the known form of the spreading code in the matched filter by starting to repeat bits from its other extremity.

If the matched filter is shorter than the spreading code in use, it is possible to use only as many samples from the received signal as can be accommodated in the matched filter, and truncate also the known form of the code sequence accordingly. Truncating, padding and other forms of changing the length of a sample sequence can be generally designated as "processing" the sample sequence.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

Figure 1:
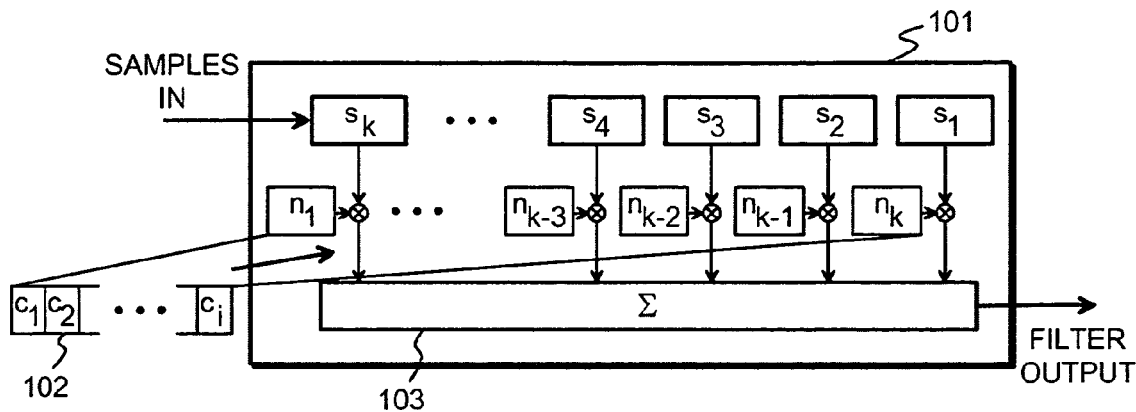
FIG. 1 illustrates known code acquisition with a fixed code length.

FIG. 1 illustrates the known CCD (charge coupled device) analogy model of a matched filter 101. A received signal is known to have been spread with a spreading code of length i. Oversampling in the receiver has resulted in a situation where the k signal samples $s_1 \ldots s_k$ represent a signal sequence spread with exactly one length of the spreading code. For example, if the spreading code is a pseudorandom bit sequence of i bits $c_1 \ldots c_i$ and the receiver oversamples with a factor of 2, there are twice as many signal samples $s_1 \ldots s_k$ as there are bits in the spreading code, i.e. k=2i. For the matched filtering the local code replica or known form 102 of the spreading code is sampled, resulting in k code samples $n_1 \ldots n_k$, the number of which thus equals the number of signal samples. (In a trivial case k=i, there would be exactly one sample per bit in the signal sequence and no code sampling would be needed.) A product $s_a \cdot n_{k-a+1}$ is calculated for each a=1 ... k and these products are summed at block 103. The filter output has a maximum when the alignment between the signal samples $s_1 \ldots s_k$ and the code samples $n_1 \ldots n_k$ is perfect, i.e. code acquisition has succeeded optimally.

Figure 2:
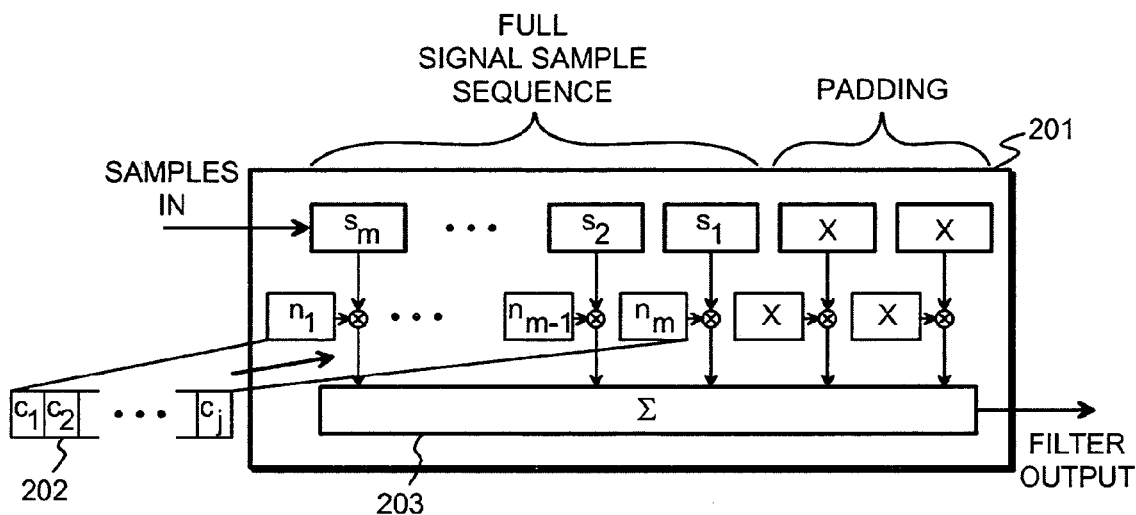
FIG. 2 illustrates the acquisition of a shorter than nominal code according to an embodiment of the invention.

FIG. 2 illustrates a case in which the matched filter 201 has been nominally designed for a code length i and a corresponding number of samples k as previously, but the code length is now j and number of samples m, with j<i and m<k respectively. According to an embodiment of the invention there is formed a padded signal sample sequence, in which a preamble of k-m neutral symbols X is added to the actual sequence of signal samples $s_1 \ldots s_m$. The length of the padded sample sequence is thus k and equals the length for which the matched filter was nominally designed. The local code replica or known form 202 of the spreading code is sampled, resulting in m code samples $n_1 \ldots n_m$, the number or which equals the number of actual signal samples. Neutral symbols X are used to complete the sequence of code samples, so that it also achieves the full length k for which the matched filter was nominally designated. In inserting the padding symbols X it must be ensured that the padding part of the padded signal sample sequence is aligned with the padding part of the code sample sequence, i.e. that the X's meet each other as is the case in the two rightmost sample locations in FIG. 2. This essentially means that if the neutral symbols constitute a preamble to the signal sample sequence, they must constitute a tail or postamble to the code sample sequence and vice versa. It is also possible to insert padding symbols at both ends of a sequence.

It should be noted that the neutral symbols X are not necessarily zeroes, depending on the actual implementation of the matched filter: there are implementations where each zero is counted as −1, or otherwise has a nontrivial effect to the operation of the matched filter. The symbol to be used as the neutral symbol X should be selected so that it contributes as little as possible to the matched filtering operation. It should be noted, however, that especially if a perfectly neutral value is found and used as X, even in the very optimal case of perfect alignment with the sequence of signal samples $s_1 \ldots s_m$ and the code samples $n_1 \ldots n_m$ the maximum output obtainable from the filter is not the same as in the case of FIG. 1, but slightly smaller (because there are less nonzero elements to be summed in block 203). Thus, if there is some signal processing element that makes deductions on the basis of the filtered output value, e.g. concerning the success of achieved code alignment, it should be informed that the scale of output values is now different than that of FIG. 1.

Figure 3:
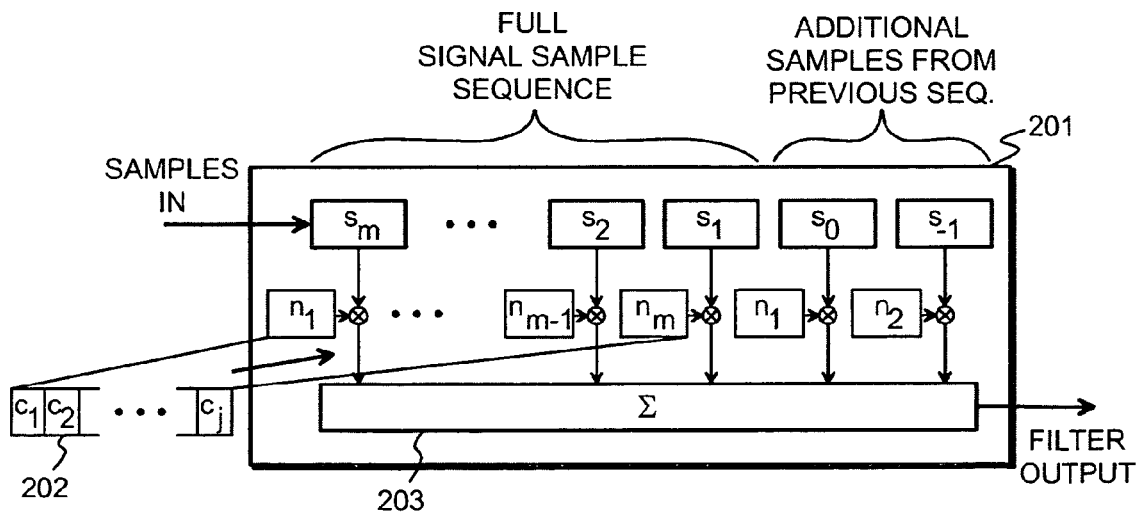
FIG. 3 illustrates the acquisition of a shorter than nominal code according to another embodiment of the invention.

FIG. 3 illustrates an alternative approach, in which no neutral symbols are used but the signal sample sequence is padded with actual signal samples taken from outside the sequence the length of which corresponds to the code length. In the exemplary case of FIG. 3 these "additional" samples are the samples $s_0$ and $s_{-1}$ taken from the end of a previous sample sequence. For the code samples cyclic continuation is used, which means that after the last code sample $n_m$ has been reached, one starts again from the beginning by using $n_1$, $n_2$ and so on until the total number of k code samples has been reached. If sampling of the received signal proceeds fast enough compared to signal acquisition, an obvious alternative to the arrangement of FIG. 3 would be to augment a signal sample sequence $s_1 \ldots s_m$ with subsequent samples $s_{m+1}$, $s_{m+2}$ and so on.

Figure 4:
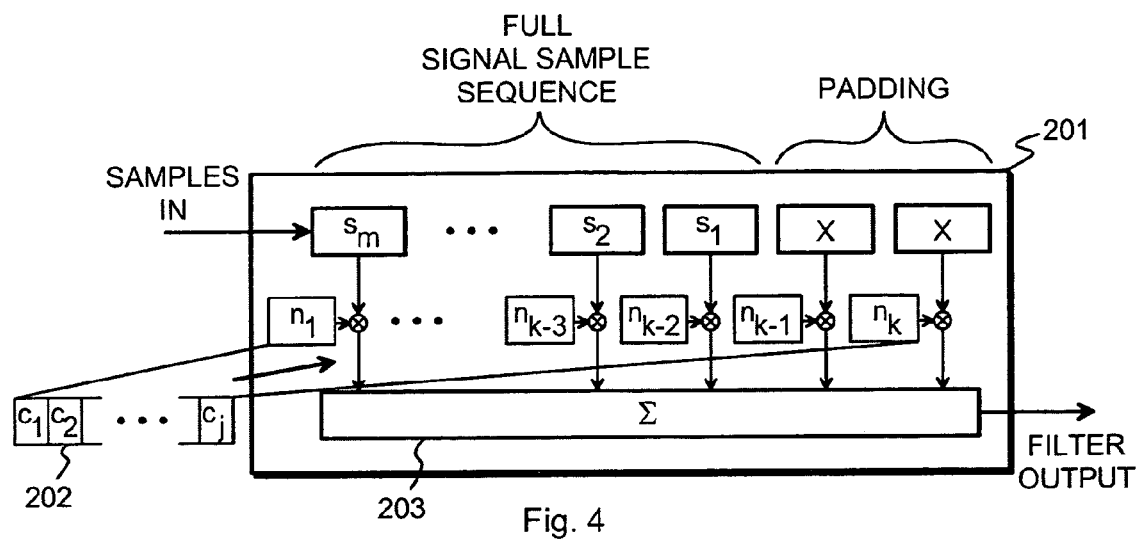
FIG. 4 illustrates the acquisition of a shorter than nominal code according to another embodiment of the invention.
Figure 5:
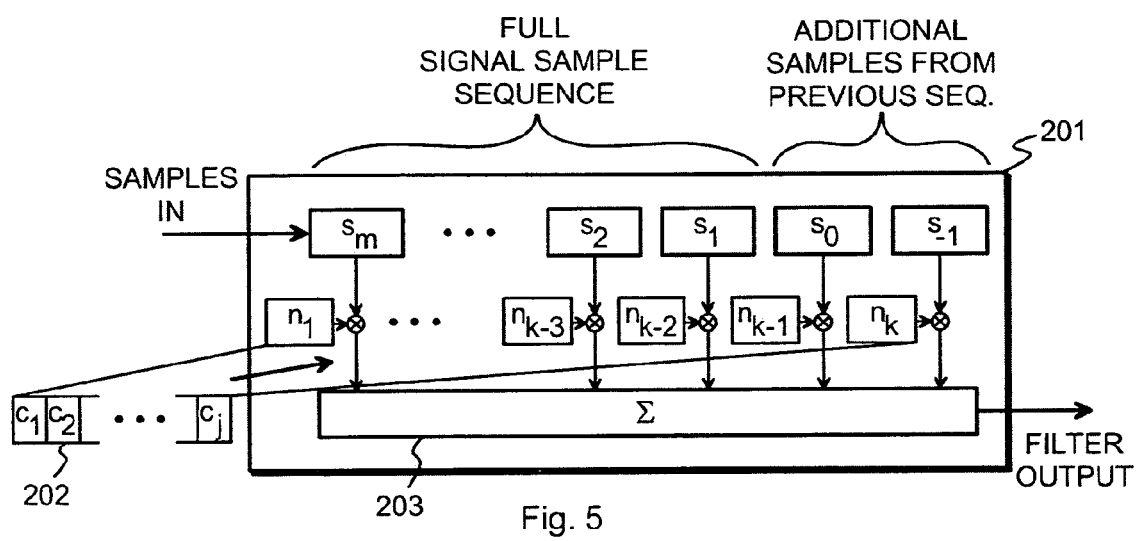
FIG. 5 illustrates the acquisition of a shorter than nominal code according to another embodiment of the invention.

FIGS. 4 and 5 illustrate alternative principles in which the local code replica or known form 202 of the spreading code is always sampled to the original full length for which the matched filter was nominally designed. In other words, a code sample sequence $n_1 \ldots n_k$ of the length k is always used irrespective of variations in code length. The signal sample sequence, however, is either padded as in FIG. 4 or continued with samples taken from an adjacent sequence as in FIG. 5. Since the number of signal samples is now different than the number of code samples, the operation of the matched filter is distorted in the same way as if there was a large doppler shift in the transmission frequency, and a consequently large error in the signal sampling frequency.

Figure 6:
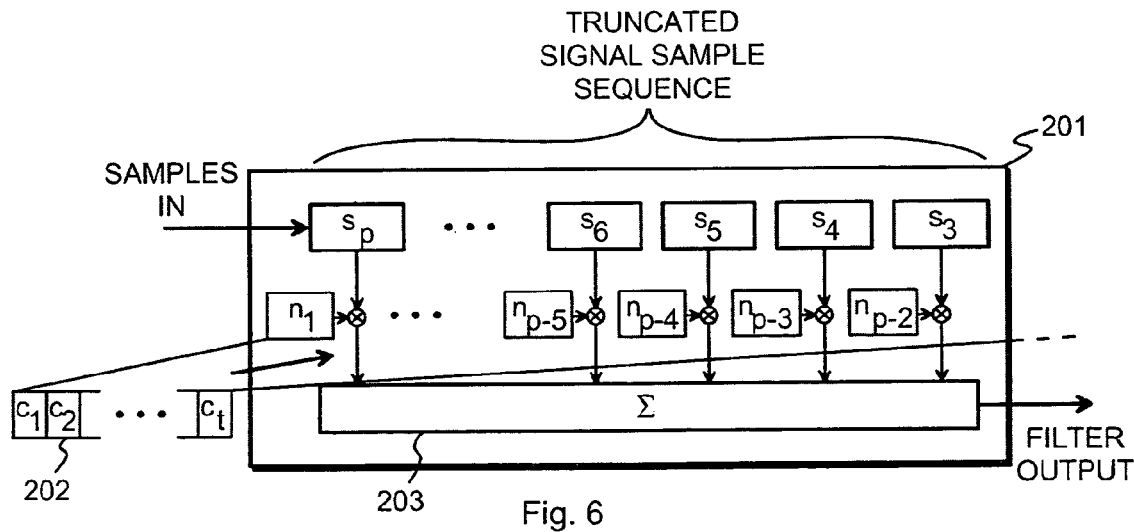
FIG. 6 illustrates the acquisision of a longer than nominal code according to another embodiment of the invention.

A somewhat different case occurs if the spreading code was longer than what the matched filter has been nominally designed for. We may assume that the signal sample sequence consists of samples $s_1 \ldots s_p$, with p>k so that the full signal sample sequence does not fit into the matched filter in one piece. This is a consequence of the fact that the code length was t, with t>i. According to the principle illustrated in FIG. 6, the same matched filter 201 can still be used, if the signal sample sequence is truncated to the length of k samples: here we assume that specifically p=k+2 and truncating was effected at the beginning of the signal sample sequence, so that only signal samples $s_3 \ldots s_p$ come to the matched filtering. The code sample sequence is likewise truncated but at the end rather than the beginning, so that the code samples $n_1 \ldots n_{p-2}$ are used for the matched filtering. Whether the code sample sequence was truncated from its beginning or its end has actually no meaning, since we are only at the code acquisition stage where the division of received signal samples into a signal sample sequence is arbitrary anyway.

The practice of truncating a signal sample sequence introduces a potential source of error. It may happen that the correct code synchronization point would have been just within that part of the received signal that was not available for detection in the matched filtering because of the truncation. However, if we assume that the spreading code was only slightly longer than what would fit into the matched filter, and correspondingly the number of signal samples omitted due to truncating was small, the probability of missing correct code synchronization for this reason is likewise small. In order to guard against even that small possibility, it is possible to build into the receiver a feature according to which if code acquisition appears to be uncertain, the preliminary selection of samples that constitutes the signal sample sequence $s_1 \ldots s_p$ is shifted within the stream of received signal samples by a number of samples that is large enough to predispose completely different samples for truncating than before.

Another, yet simpler possibility is to make the matched filter long enough to accommodate even the longest spreading code that will be used in a system. In that case truncating would never become actual, but only padding according to one of the embodiments described earlier.

In a manner analogous to FIGS. 4 and 5 one could present an alternative embodiment in which only the signal sample sequence was truncated but not the code sample sequence, which was made to have the constant length of k samples again. However, in that case there would be both the above-mentioned error source inherently due to truncating and the other "doppler shift analogy" error source described earlier, which together would probably render said alternative embodiment quite useless.

We should note that even if FIGS. 1 to 6 use the CCD analogy model to schematically illustrate the operation of a matched filter, the invention is by no means limited to some specific technology of implementing the matched filters, or even to using structures strictly designated as matched filters for code aqcuisition. Known principles are based on e.g. using comparators or calculating fast Fourier transforms. It is a common feature of all code acquisition hardware that they take a certain sequence of signal samples and a certain sequence of code samples as input information. Usually also the planned length of the spreading code and the oversampling ratio to be used dictate the internal structure of such code acquisition hardware so that there is a specific, fixed number of circuit elements designated to receive and process a specific fixed number of signal samples and/or code samples. The principles described above are applicable to all such code acquisition hardware irrespective of their actual detailed operating principle.

As an example of the sample numbers that might be encountered in a practical application we may think that a maximum code length could correspond to a sequence of 2046 signal samples. Assuming an oversampling rate of 2, that would correspond to the spreading code length of 1023 bits. Allowing shorter spreading codes to have a length not shorter than 1020 bits would mean that the shortest sample sequences to be handled in the matched filter would be 2040 samples long, necessitating the use of 6 neutral symbols for padding.

Figure 7:
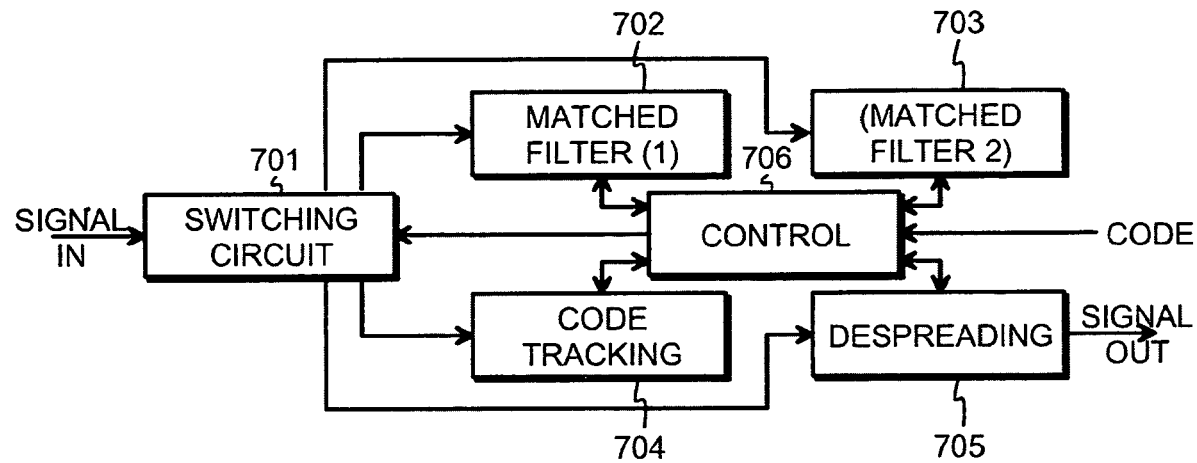
FIG. 7 illustrates a signal processing module according to an embodiment of the invention.

FIG. 7 illustrates a signal processing module according to an embodiment of the invention. Parts of the signal processing module are a switching circuit 701, a matched filter 702 or corresponding piece of code acquisition hardware, an optional second matched filter 703 or corresponding piece of code acquisition hardware, a code tracking loop 704, a signal despreading unit 705 as well as a control unit 706. The signal processing module may contain also other parts and functional blocks.

The control unit 706 is adapted to receive information about the length of a code that has been used to spread a signal, the reception and code acquisition of which has become actual. As a minimum, the signal processing module must contain one matched filter 702 or a corresponding piece of code acquisition hardware. One case in which the existence of two matched filters could be justified is such where the predicted variation in code lengths is large. The matched filters 702 and 703 could be designed for different nominal code lengths, so that the control unit 706 would be adapted to always select the matched filter with the closest possible match between nominal code length and the code length actually in use. In any case the control unit 706 is adapted to use the received information about the length of a code to initialize the possible padding or truncating operations that will be needed to perform the code acquisition in the selected matched filter. Directing samples of a received signal to a selected matched filter takes place in the switching circuit 701 as per instructions from the control unit 706.

The matched filter(s) 702 (and 703) are adapted to deliver the filter output to the control unit 706, which uses it to determine the code synchronization, i.e. to find the correct timing parameters to be used in subsequent code tracking. In a manner known as such, the control unit 706 is adapted to respond to successful code acquisition by commanding the switching circuit 701 to convey subsequent samples of the received signal to the code tracking loop 704, which refines the values of the timing parameters, as well as to the actual despreading in the signal despreading unit 705.

Figure 8:
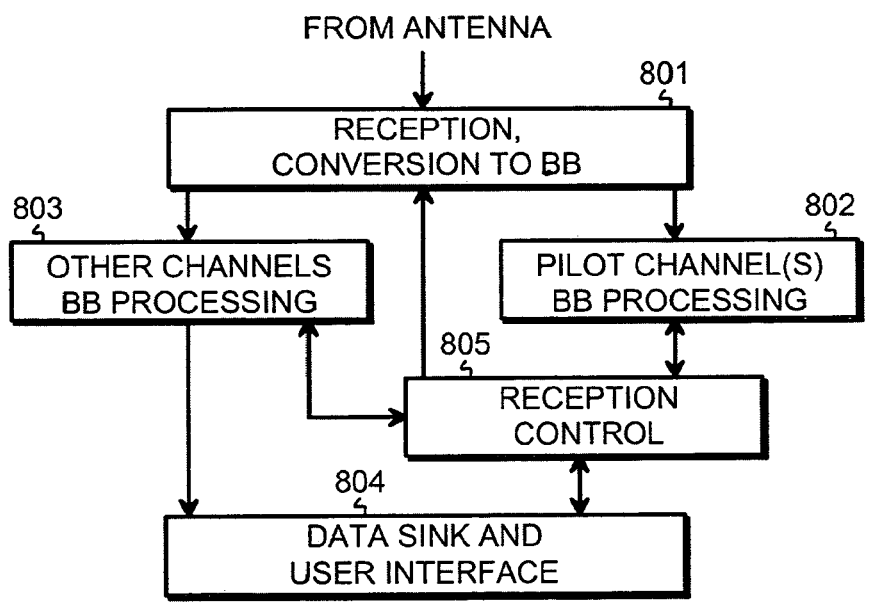
FIG. 8 illustrates a radio receiver device according to an embodiment of the invention.

FIG. 8 illustrates schematically a radio receiver device according to an embodiment of the invention. The radio frequency signal coming from an antenna is received and converted to baseband in block 801. For baseband processing there are two parallel blocks, of which block 802 is adapted for the baseband processing of a pilot channel while block 803 is adapted for the baseband processing of other channels that need e.g. code acquisition. Payload information goes from block 803 to a data sink and user interface block 804. For handling signalling information and for otherwise controlling the reception of information there is a general control block 805.

In the schematic diagram of FIG. 8 the module described above with reference to FIG. 7 would be located in block 803. One exemplary way in which said module can get information about the currently applicable code length is receiving it from the control block 805, which in turn may have deducted it from e.g. from the characteristics of a pilot signal it has received through block 802.

Figure 9:
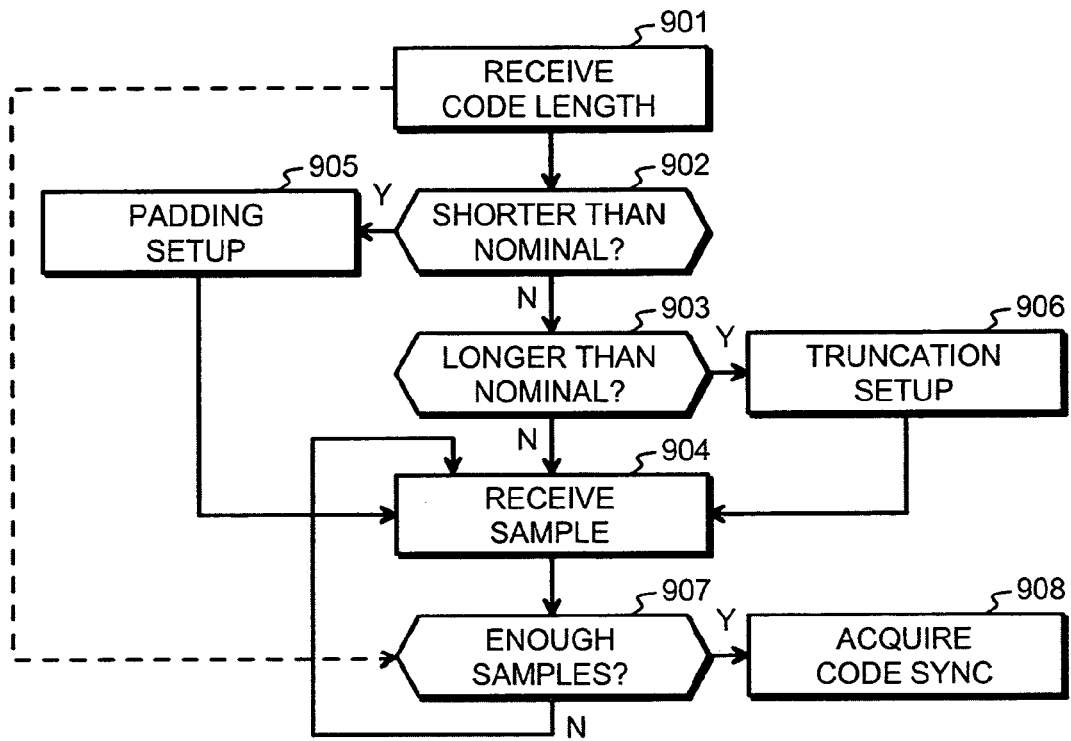
FIG. 9 illustrates a method according to an embodiment of the invention, and the execution of a computer program according to an embodiment of the invention.

FIG. 9 illustrates a method according to an embodiment of the invention. The description of a method can be also understood to describe the execution of a computer program according to the invention. Information about currently used code length is received or otherwise established at step 901. If the code length equals the nominal length for which a matched filter or corresponding piece of code acquisition hardware has been nominally designed, the method proceeds directly through the checks of steps 902 and 903 to receiving samples at step 904. A shorter than nominal code length causes a diversion from the check of step 902 to step 905, in which padding of sample sequences is initalized appropriately, depending on which of the embodiments illustrated earlier with references to FIGS. 2 to 5 is in use. If, on the other hand, the current code was found in the check of step 903 to be longer than the nominal value, truncating operations are initialized at step 906. Initalizing at any of steps 905 and 906 typically means setting the boundary values used by some counters that control the insertion of signal samples and/or code samples as well as possible padding values to the code acquisition hardware.

Filling the code acquisition hardware with the appropriate sample values takes place in the loop consisting of steps 904 and 907. It should be noted that the criterion applied at step 907 for determining the sufficiency of samples must take into account the actual code length; hence the dashed arrow illustrating the transportation of information from step 901 to step 907. In other words, even if the nominal dimensions of a piece of code acquisition hardware would call for a code acquisition cycle of the length $i \cdot S \cdot \Delta t$, where i is the nominal code length, S is the oversampling rate and $\Delta t$ is the sample time interval, the full number of samples applied as a criterion at step 907 must each time match the exact length of a signal sequence spread with one run of the spreading code. Using the notation of FIGS. 2 to 6, if the spreading code is shorter than the nominal value, the length of a code acquisition cycle must be $j \cdot S \cdot \Delta t$ (which is equal to $m \cdot \Delta t$, since $j \cdot S = m$), and if the spreading code is longer than the nominal value, the length of a code acquisition cycle must be $t \cdot S \cdot \Delta t$ (which is equal to $p \cdot \Delta t$).

When enough signal samples have been received and given to the code acquisition hardware, code acquisition is performed at step 908. Only if code aqcuisition is not successful, there should be needed a return from step 908 to e.g. the beginning at step 901.

Figure 10:
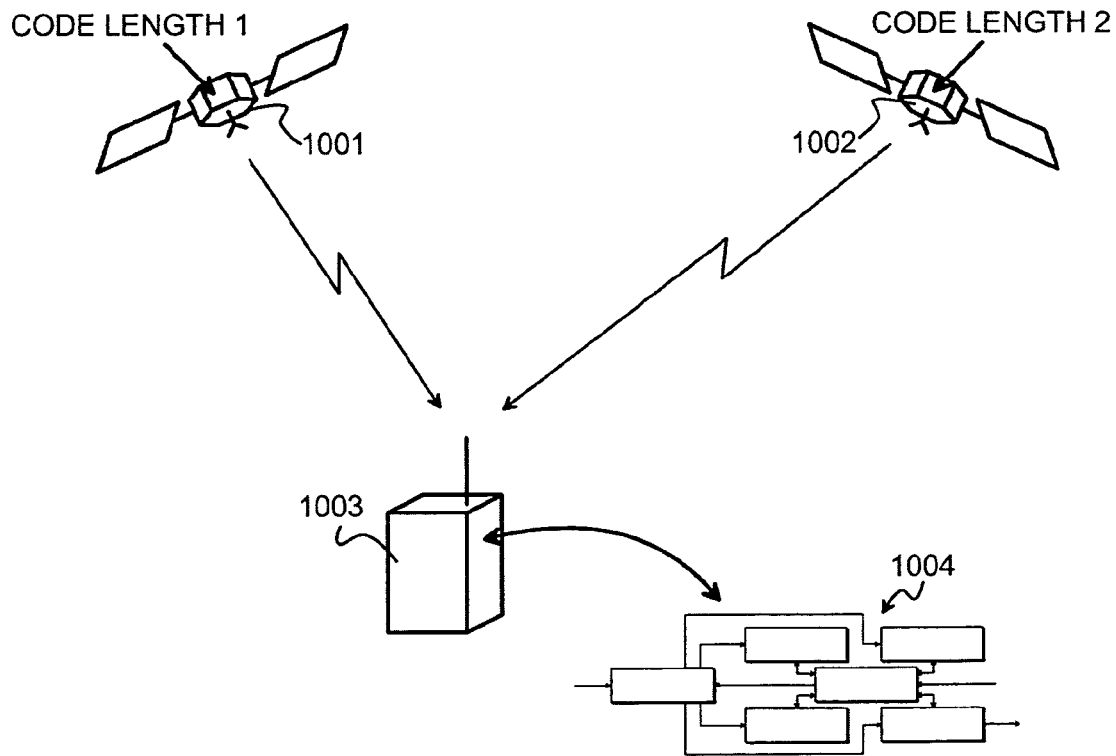
FIG. 10 illustrates a system according to an embodiment of the invention.

FIG. 10 illustrates certain system aspects of an exemplary system according to an embodiment of the invention. There are two CDMA transmitters 1001 and 1002, shown here to fly on board satellites that are adapted to spread their transmissions using different code lengths: CODE LENGTH 1≠CODE LENGTH 2. A receiver 1003 comprises a module 1004 adapted to perform code acquisition to codes of at least two different length with a shared piece of code acquisition hardware, by applying the method illustrated above in association with FIG. 9.

The invention claimed is:

1. A method for determining code synchronization timing in relation to a spread spectrum transmission, comprising:

receiving a number of signal samples, said number of signal samples constituting a signal sample sequence that represents a length of a received signal spread with a pseudorandom sequence used as a spreading code, said pseudorandom sequence having a length, as a response to the length of said pseudorandom sequence being different than a dimension of a piece of code acquisition means, processing said signal sample sequence, thus producing a processed signal sample sequence, correlating said processed signal sample sequence with a locally produced sample sequence that comprises code samples representing a known form of said spreading code, thus producing a correlation, and using a result of said correlation as a basis for determining a code synchronization wherein said locally produced sample sequence contains as many code samples as there are signal samples in the signal sample sequence before said processing, wherein processing said signal sample sequence involves augmenting said signal sample sequence at least at one end with at least one additional symbol, thus producing a padded signal sample sequence, and said locally produced sample sequence contains additionally neutral symbols used to fill in said locally produced sample sequence to a length that is equal to the length of said padded signal sample sequence, and wherein said additional symbols used to augment said signal sample sequence at least at one end are signal samples from another signal sample sequence that represents a length of a received signal spread with one full length of a pseudorandom sequence used as a spreading code.

2. A method, comprising:

receiving a number of signal samples, said number of signal samples constituting a signal sample sequence that represents a length of a received signal spread with a pseudorandom sequence used as a spreading code, said pseudorandom sequence having a length, as a response to the length of said pseudorandom sequence being different than a dimension of a piece of code acquisition hardware, processing said signal sample sequence, thus producing a processed signal sample sequence, correlating said processed signal sample sequence with a locally produced sample sequence that comprises code samples representing a known form of said spreading code, thus producing a correlation, and using a result of said correlation as a basis for determining a code synchronization; wherein said locally produced sample sequence contains as many code samples as there are signal samples in the signal sample sequence before said processing, and wherein processing said signal sample sequence involves augmenting said signal sample sequence at least at one end with at least one additional symbol, and wherein said additional symbols used to augment said signal sample sequence at least at one end are signal samples from another signal sample sequence that represents a length of a received signal spread with one full length of a pseudorandom sequence used as a spreading code.

3. A method for determining code synchronization timing in relation to a spread spectrum transmission, comprising:

receiving a number of signal samples, said number of signal samples constituting a signal sample sequence that represents a length of a received signal spread with a pseudorandom sequence used as a spreading code, said pseudorandom sequence having a length, as a response to the length of said pseudorandom sequence being different than a dimension of a piece of code acquisition means, processing said signal sample sequence, thus producing a processed signal sample sequence, correlating said processed signal sample sequence with a locally produced sample sequence that comprises code samples representing a known form of said spreading code, thus producing a correlation, and using a result of said correlation as a basis for determining a code synchronization, wherein said locally produced sample sequence contains:

a continuous sequence of code samples representing a known form of a full length of said spreading code, and a number of additional code samples obtained as a cyclic continuation of said continuous sequence of code samples from an opposite extremity thereof.

4. A method for determining code synchronization timing in relation to a spread spectrum transmission, comprising:
receiving a number of signal samples, said number of signal samples constituting a signal sample sequence that represents a length of a received signal spread with a pseudorandom sequence used as a spreading code, said pseudorandom sequence having a length,
as a response to the length of said pseudorandom sequence being different than a dimension of a piece of code acquisition means, processing said signal sample sequence, thus producing a processed signal sample sequence,
correlating said processed signal sample sequence with a locally produced sample sequence that comprises code samples representing a known form of said spreading code, thus producing a correlation, and
using a result of said correlation as a basis for determining a code synchronization
receiving information about the length of a spreading code that has been used to spread the received signal,
comparing said length of a spreading code to a dimension of a piece of code acquisition hardware,
if said comparison shows said length of a spreading code to be smaller than said dimension of said piece of code acquisition hardware, augmenting the received signal sample sequence at least at one end with at least one additional symbol, thus producing a padded signal sample sequence, correlating said padded signal sample sequence with a locally produced sample sequence that comprises code samples representing a known form of said spreading code, and using a result of said correlating as a basis for determining code synchronization,
if said comparison shows said length of a spreading code to equal said dimension of said piece of code acquisition hardware, correlating a received signal sample sequence with a locally produced sample sequence that comprises code samples representing a known form of said spreading code, and using a result of said correlating as a basis for determining code synchronization, and
if said comparison shows said length of a spreading code to be larger than said dimension of code acquisition hardware, truncating a received signal sample sequence at least at one end, thus obtaining a truncated signal sample sequence, and correlating said truncated signal sample sequence with a truncated locally produced sample sequence that comprises a subset of a full number of code samples representing a known form of said spreading code, and using a result of said correlating as a basis for determining code synchronization.

5. A device, comprising:
a piece of code acquisition hardware adapted to receive a signal sample sequence that represents a received signal spread with a pseudorandom sequence used as a spreading code, which pseudorandom sequence has a length;
wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, and wherein the receiver device is adapted to use a result of said correlating as a basis for determining code synchronization, wherein said piece of code acquisition hardware is configured to augment said signal sample sequence at least at one end with at least one additional symbol to produce a padded signal sample sequence to be used as said processed signal sample sequence, and wherein said piece of code acquisition hardware is configured to use as said additional symbols signal samples from another signal sample sequence that represents a length of a received signal spread with one full length of a pseudorandom sequence used as a spreading code.

6. A device according to claim 5, wherein said piece of code acquisition hardware comprises a matched filter adapted to receive a fixed number of signal samples for correlation with a locally produced code sample sequence, which fixed number is equal to the number of samples in said signal sample sequence and the number of said additional symbols taken together.

7. A device according to claim 5, comprising a reception and baseband conversion block adapted to receive a spread spectrum transmission and to convert it into signal samples on a baseband frequency.

8. A device according to claim 5, wherein the receiver device is a satellite positioning receiver.

9. A device for receiving and decoding a spread spectrum transmission, comprising:
a piece of code acquisition hardware adapted to receive a signal sample sequence that represents a received signal spread with a pseudorandom sequence used as a spreading code, which pseudorandom sequence has a length;
wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, and wherein the receiver device is adapted to use a result of said correlating as a basis for determining code synchronization, comprising a reception control block adapted to derive a length of said spreading code from information received on a pilot channel, which reception control block is further adapted to deliver said length of said spreading code for use in said piece of code acquisition hardware.

10. A signal processing module for performing code acquisition in receiving and decoding spread spectrum transmissions, comprising a piece of code acquisition hardware adapted to receive a signal sample sequence that represents a received signal spread with a pseudorandom sequence used as a spreading code, which pseudorandom sequence has a length, wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, wherein said piece of code acquisition hardware is configured to augment said signal sample sequence at least at one end with at least one additional symbol to produce a padded signal sample sequence to be used as said processed signal sample sequence, and wherein said piece of code acquisition hardware is configured to use as said additional symbols signal samples from another signal sample sequence that represents a length of a received signal spread with one full length of a pseudorandom sequence used as a spreading code.

11. A signal processing module for performing code acquisition in receiving and decoding spread spectrum transmissions, comprising a piece of code acquisition hardware adapted to receive a signal sample sequence that represents a received signal spread with a pseudorandom sequence used as a spreading code, which pseudorandom sequence has a length, wherein said piece of code acquisition hardware is adapted to respond to the length of said pseudorandom sequence being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, comprising a first piece of code acquisition hardware and a second piece of code acquisition hardware, of which said first piece of code acquisition hardware is adapted to receive a signal sample sequence that represents a length of a received signal spread with one full length of a pseudorandom sequence having a first length, and said second piece of code acquisition hardware is adapted to receive a signal sample sequence that represents a length of a received signal spread with one full length of a pseudorandom sequence having a second length different than said first length, and said signal processing module is adapted to select for use that of said first piece of code acquisition hardware and said second piece of code acquisition hardware for which the corresponding length of pseudorandom sequence is closer to the length of a pseudorandom sequence used for spreading a signal that has been received.

12. A system for communicating with spread spectrum signals, comprising:
  a first transmitter adapted to use a first pseudorandom sequence for producing spread spectrum transmissions,
  a second transmitter adapted to use a second pseudorandom sequence for producing spread spectrum transmissions, said second pseudorandom sequence being shorter in length than said first pseudorandom sequence,
  a receiver adapted to receive spread spectrum transmissions from both said first transmitter and said second transmitter,
  in said receiver a piece of code acquisition hardware adapted to receive a signal sample sequence that represents a length of a received signal spread with one full length of a pseudorandom sequence used as a spreading code;
  wherein said piece of code acquisition hardware is adapted to respond to the length of said pseudorandom sequence used as a spreading code being different than a dimension of said piece of code acquisition hardware by processing said signal sample sequence to produce a processed signal sample sequence, and said piece of code acquisition hardware is also adapted to correlate said processed signal sample sequence with a locally produced sample sequence that comprises code samples representing a known form of said spreading code, and wherein the receiver device is adapted to use a result of said correlating as a basis for determining a code synchronization.

13. A code acquisition module having embodied therein a computer program for controlling code acquisition in a receiver adapted to receive and decode spread spectrum transmissions, said computer program comprising:
  computer code adapted to drive a piece of code acquisition hardware to augmenting a signal sample sequence at least at one end with at least one additional symbol, thus producing a padded signal sample sequence, and
  computer code adapted to drive said piece of code acquisition hardware to correlating said padded signal sample sequence with a locally produced sample sequence that comprises code samples representing a known form of said spreading code,
  wherein said locally produced sample sequence contains as many code samples as there are signal samples in the signal sample sequence before said processing, and wherein processing said signal sample sequence involves augmenting said signal sample sequence at least at one end with a least one additional symbol, and wherein said at least one additional symbol used to augment said signal sample sequence at least at one end comprise one or more signal samples from another signal sample sequence that represents a length of a received signal spread with one full length of a pseudorandom sequence used as a spreading code.

* * * * *